US012676151B2

(12) United States Patent
Singh et al.

(10) Patent No.: US 12,676,151 B2
(45) Date of Patent: Jul. 7, 2026

(54) SYSTEM AND METHOD FOR DATA VISUALIZATION ON SPATIAL COMPUTING DEVICE BASED ON CASCADING MACHINE LEARNING APPROACH

(71) Applicant: Bank of America Corporation, Charlotte, NC (US)

(72) Inventors: Shailendra Singh, Thane West (IN); Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 188 days.

(21) Appl. No.: 18/611,083

(22) Filed: Mar. 20, 2024

(65) Prior Publication Data

US 2025/0299667 A1     Sep. 25, 2025

(51) Int. Cl.
| | |
|---|---|
| *G10L 15/22* | (2006.01) |
| *G10L 15/00* | (2013.01) |
| *G10L 15/14* | (2006.01) |

(52) U.S. Cl.
CPC ............ *G10L 15/22* (2013.01); *G10L 15/005* (2013.01); *G10L 15/14* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,141,882 | B1 * | 9/2015 | Cao ......................... | G06F 16/35 |
| 9,773,501 | B1 * | 9/2017 | Brooksby ............... | G10L 15/26 |
| 10,764,431 | B1 * | 9/2020 | Pham ................... | H04M 3/5166 |
| 11,437,045 | B1 * | 9/2022 | Daly ....................... | G10L 17/22 |
| 11,468,890 | B2 | 10/2022 | Gada et al. | |
| 11,863,507 | B2 | 1/2024 | Fejes et al. | |
| 11,880,936 | B1 * | 1/2024 | Jia ........................ | G06F 3/04895 |
| 11,947,872 | B1 * | 4/2024 | Mahler-Haug .......... | G10L 15/08 |
| 12,124,812 | B2 * | 10/2024 | Li .......................... | G06F 40/216 |
| 12,315,498 | B1 * | 5/2025 | Sun ........................ | G10L 15/30 |
| 12,361,228 | B2 * | 7/2025 | Sabapathy ............ | G06F 16/345 |
| 12,393,617 | B1 * | 8/2025 | Niu ..................... | G06F 16/3329 |
| 2005/0209868 | A1 * | 9/2005 | Wan ................... | G06Q 10/0639 |
| | | | | 705/345 |

(Continued)

FOREIGN PATENT DOCUMENTS

| | | |
|---|---|---|
| CA | 2890963 C | 2/2018 |

*Primary Examiner* — Douglas Godbold

(57) ABSTRACT

The disclosed system utilizes a language classifier to identify the language of a communication transcript. Additionally, the system identifies the intent of the communication transcript using a first natural language processing (NLP) MLM, detects keywords within the communication transcript using a second NLP MLM, and selects target data records to associate with the communication transcript. The selection of target data records includes determining, for each data record from a set of data records, a probability score indicating the likelihood that each data record is associated with the communication transcript. This probability score is determined by a data record prediction MLM. Moreover, the system selects target data records with the highest-ranking probability scores. Finally, the system generates a display report based on the selected target data records and renders the display report on a display of a spatial computing device.

20 Claims, 6 Drawing Sheets

(56)　　　　　References Cited

U.S. PATENT DOCUMENTS

| | | | | |
|---|---|---|---|---|
| 2007/0156910 | A1 | 7/2007 | Christie et al. | |
| 2012/0016678 | A1 | 1/2012 | Gruber et al. | |
| 2012/0166188 | A1* | 6/2012 | Chakra | G10L 21/0208 |
| | | | | 704/226 |
| 2013/0110505 | A1 | 5/2013 | Gruber et al. | |
| 2013/0110515 | A1 | 5/2013 | Guzzoni et al. | |
| 2013/0110518 | A1 | 5/2013 | Gruber et al. | |
| 2013/0110519 | A1 | 5/2013 | Cheyer et al. | |
| 2013/0110520 | A1 | 5/2013 | Cheyer et al. | |
| 2013/0111348 | A1 | 5/2013 | Gruber et al. | |
| 2013/0111487 | A1 | 5/2013 | Cheyer et al. | |
| 2013/0117022 | A1 | 5/2013 | Chen et al. | |
| 2013/0185074 | A1 | 7/2013 | Gruber et al. | |
| 2013/0185081 | A1 | 7/2013 | Cheyer et al. | |
| 2014/0044243 | A1 | 2/2014 | Monegan et al. | |
| 2016/0162905 | A1 | 6/2016 | Singh et al. | |
| 2016/0239848 | A1 | 8/2016 | Chang et al. | |
| 2019/0332657 | A1* | 10/2019 | Jones | G16H 30/40 |
| 2019/0385014 | A1* | 12/2019 | Malak | G06F 40/146 |
| 2020/0007474 | A1* | 1/2020 | Zhang | G06F 40/20 |
| 2020/0211544 | A1* | 7/2020 | Mikhailov | G10L 15/22 |
| 2020/0279556 | A1 | 9/2020 | Gruber et al. | |
| 2020/0380389 | A1 | 12/2020 | Eldeeb et al. | |
| 2021/0191923 | A1* | 6/2021 | Amulu | G06F 16/243 |
| 2021/0201238 | A1* | 7/2021 | Sekar | G06N 3/09 |
| 2021/0375291 | A1* | 12/2021 | Zeng | H04L 67/306 |
| 2022/0130373 | A1* | 4/2022 | Nakada | G10L 15/005 |
| 2022/0350963 | A1* | 11/2022 | Copeland | H04L 65/1104 |
| 2023/0029707 | A1* | 2/2023 | Adibi | G06F 16/90335 |
| 2024/0194178 | A1* | 6/2024 | Austraat | G10L 15/16 |
| 2024/0221721 | A1* | 7/2024 | Hiray | G10L 15/005 |
| 2024/0257798 | A1* | 8/2024 | Nieto-Caballero | G10L 15/005 |
| 2024/0283868 | A1* | 8/2024 | Ferris | G06F 40/253 |
| 2024/0403563 | A1* | 12/2024 | Bex, IV | G06F 16/383 |
| 2025/0258850 | A1* | 8/2025 | Haikin | G06N 20/00 |

* cited by examiner

SYSTEM AND METHOD FOR DATA VISUALIZATION ON SPATIAL COMPUTING DEVICE BASED ON CASCADING MACHINE LEARNING APPROACH

TECHNICAL FIELD

The present disclosure relates generally to data visualization, and more specifically to a system and method for data visualization on spatial computing device based on cascading machine learning approach.

BACKGROUND

In the dynamic landscape of technology aimed at enhancing client experiences during interactions with information-providing systems, Interactive Voice Response (IVR) systems are important in facilitating such engagement. Positioned as the first point of contact, IVR call executives act as bridges between individuals seeking help and the support they need. However, these call executives face a significant challenge, including a lack of easily accessible reference material, which hampers their ability to help callers efficiently and provide satisfactory experiences.

SUMMARY

The disclosed system and method described in the present disclosure is particularly integrated into a practical application of providing data visualization on spatial computing devices.

The present disclosure contemplates a system and method for selecting data records for displaying on spatial computing device based on information obtained from interacting with a client.

In an example embodiment, the disclosed system includes a memory configured to store a set of data records. Further, a processor of the system is operably coupled to the memory and is configured to identify a language of a call using a language classifier and identify an intent of a communication transcript of the call by processing the communication transcript using a first natural language processing (NLP) machine learning model (MLM). Further, the processor is configured to identify keywords within the communication transcript using a second NLP MLM, the keywords related to information stored in the set of data records and select a set of target data records from the set of data records to associate with the communication transcript. The selecting of the set of target data records includes determining for each data record from the set of data records, a probability score that each data record is associated with the communication transcript, wherein the probability score being determined by a data record prediction model, and choosing the set of target data records being data records with corresponding probability scores having highest ranking, wherein a number of target data records within the set of target data records is a selected number. Additionally, the processor is configured to generate a display report based on the selected set of target data records and render the display report on the display of the spatial computing device.

The disclosed system and method improve the interaction between clients and various information-providing systems through the integration of advanced technologies with human communication. By leveraging machine learning models and natural language processing techniques, this approach empowers IVR call executives to deliver more personalized and accurate assistance to clients. Through language identification and intent recognition, the system gains insights into clients' needs, enabling tailored responses and solutions. Additionally, by extracting keywords from communication transcripts, relevant information is swiftly pinpointed, ensuring prompt and pertinent assistance.

This streamlined interaction process is further facilitated by automating the selection of relevant data records. Utilizing data record prediction models, the system intelligently identifies and prioritizes data records associated with client inquiries. This not only saves time for IVR call executives but also ensures that clients receive timely and accurate information, leading to positive experiences and satisfaction.

Moreover, automating the selection process improves allocation of computing device resources. Instead of manually sifting through extensive databases under a human supervision, the system efficiently identifies and presents the most suitable data records. This optimization maximizes computing resources utilization, enabling IVR call executives to focus on delivering exceptional service to clients.

In real-world scenarios, particularly in industries reliant on efficient client interactions such as customer service, technical support, and sales, this method holds practical value. For example, when a customer calls a technical support hotline seeking assistance, the system identifies the language used, discerns the specific issue, and extracts pertinent keywords from the conversation. This collective information is then used to automatically select and present relevant troubleshooting guides or product manuals to the IVR representative, enhancing the overall client experience.

In essence, this innovative approach improves client interactions by empowering IVR call executives with the necessary tools and information to efficiently deliver exceptional service. Whether in customer service, technical support, or sales, the streamlined process ensures that clients receive prompt, personalized, and effective assistance, therefore, fostering positive relationships and driving business success. Overall, this method transforms client interactions by leveraging cutting-edge technologies to streamline processes, enhance accuracy, and improve responsiveness, thus, fostering more meaningful and efficient interactions between clients and IVR call executives.

Using machine learning systems discussed herein result in a specific improvement of operation of a computer, as such approaches cannot be replaced by already known methods that utilize, for example, rule-based approaches. Combining different machine learning models, as discussed herein, results in an approach that not only enhances client interactions but also represents a significant improvement in the operation of computing devices. This approach, known as cascading machine learning analysis, harnesses the collective power of diverse models to tackle complex tasks efficiently and effectively.

Firstly, cascading machine learning analysis elevates the capabilities of computing devices by enabling them to handle intricate data analysis tasks with accuracy and speed. By leveraging specialized models for language identification, intent recognition, and keyword extraction, computing devices can process and interpret client queries with required precision, leading to more tailored and insightful responses.

Moreover, this approach facilitates the integration of different machine learning models, allowing computing devices to refine and enrich data iteratively. The sequential application of models ensures that each stage of the analysis builds upon the insights gained from the previous stage, resulting in increasingly refined and accurate outcomes. This iterative refinement process enhances the overall performance of computing devices, enabling them to deliver more sophisticated and contextually relevant responses to user queries.

Furthermore, cascading machine learning analysis enables computing devices to extract deeper insights from complex datasets, thereby enhancing their analytical capabilities. By sequentially applying different models to analyze data, computing devices can uncover hidden patterns, correlations, and relationships that may not be readily apparent through individual analysis methods. This deeper level of insight empowers computing devices to provide more meaningful and actionable information to users, thus, improving decision-making and driving better outcomes.

Therefore, cascading machine learning analysis represents a significant advancement in the operation of computing devices, particularly in analyzing data from clients and identifying data records for display on spatial computing devices. By employing a combination of different machine learning models, computing devices can provide data for responses that is finely tuned and contextually appropriate.

Some embodiments of this disclosure may include various aspects of the system and method that will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
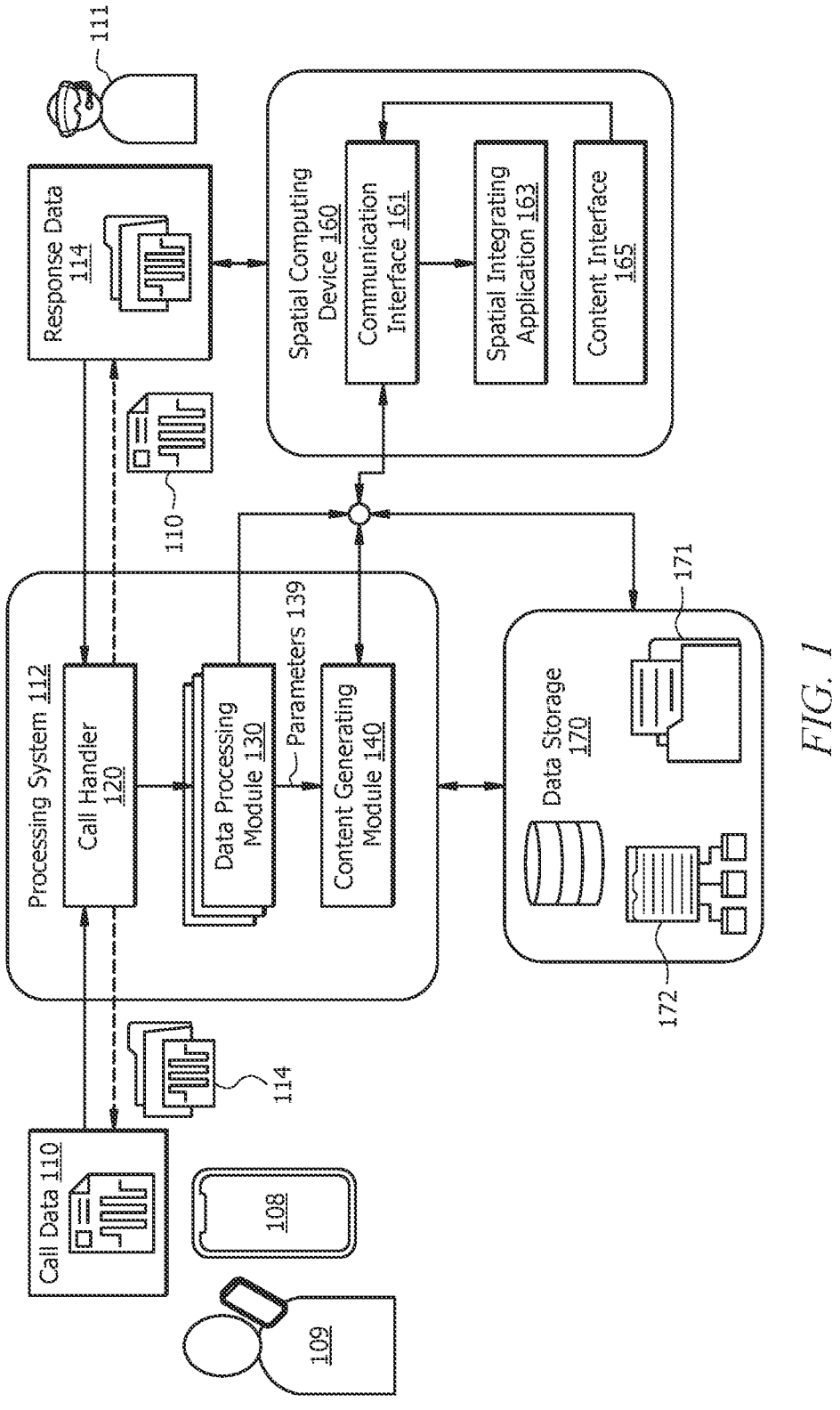
FIG. 1 illustrates an embodiment of a system for processing transmitted data and selecting data records for displaying using spatial computing device, according to an embodiment.

Various embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" can also be used herein.

System for Processing Transmitted Data and Selecting Data Records for Displaying Using Spatial Computing Device Various embodiments of the present disclosure describe a system and method for selecting data to be displayed on a spatial computing device's display in response to transmitted data. This transmitted data may take various forms, such as audio data representing a client call, text data, video data representing a client conversation, multimedia data, and similar formats. The system and method disclosed herein are tailored to process call data, which can comprise any appropriate audio and/or video data. Additionally, this call data may be accompanied by supplementary data, including text messages, attachments, documents, images, and similar content. Herein, in this disclosure, the concept of "call" is broadened beyond just audio transmissions. It can include any communication that involves data exchange, including chat conversations, video meetings, emails, and similar interactions.

Overview of the Systems for Exchanging Call and Response Data

In illustrative embodiments, the system and method involve receiving transmitted data, such as call data, analyzing it to determine various information contained within, and subsequently generating a response. This call data originates from a "caller" and is managed by a "responder" or "agent." The caller may include individuals, groups, or other entities, such as artificial intelligence agents or software applications configured to transmit or generate the data. For example, it's conceivable that the "caller" might be a natural language processing (NLP) algorithm designed to interact with the system for data processing purposes.

The responder or agent can be any suitable entity capable of providing a response to the caller. For instance, the agent could be a person who furnishes information to the caller. Alternatively, the agent might be a virtual assistant, such as an Interactive Voice Response (IVR) system configured to generate an audio response. In some scenarios, the IVR system could be used to help human agents.

The IVR system is configured to include a first processing system for processing the data communicated during the call (such data herein is referred to as a transmitted data or call data) and a second system (herein referred to as a spatial computing device) for displaying information for supporting the call for an agent. In various cases, the processing system may determine data records for presenting to the agent via the spatial computing device.

FIG. 1 depicts an example diagram illustrating a processing system 112 a spatial computing device 160, a caller device 108, and a data storage 170. In various embodiments, processing system 112 is designed to receive call data 110 from a user 109 (also referred to herein as caller 109) and response data 114 from an agent 111.

Caller System and Spatial Computing Device for Responding to a Caller

In various embodiments, a communication between caller 109 and agent 111 can take various forms, involving any suitable exchange of data between them. For instance, this exchange could involve the transmission of audio data, such as in a standard phone call, the exchange of video data in a video call, the transfer of text data in a chat conversation, or any other appropriate form of transfer of call data 110 and response data 114.

As discussed before, call data 110 may include audio data. Additionally, or alternatively, it can include various other types of data, such as text, images, multimedia, video, or any suitable data (e.g., software code, binary files, CAD files, modeling files, etc.), as well as combination thereof. Similarly, response data 114 can include any appropriate data provided in response to call data 110, similar to call data 110. In some cases, response data 114 may be captured by an audio capturing device (e.g., a microphone) associated with spatial computing device 160. Additionally, or alternatively, response date 114 may be generated via spatial computing device 160 by user interacting with various data displayed by spatial computing device 160. For example, response data 114 may be related to data retrieved from data storage 170, as schematically indicated by connection of spatial computing device 160 and data storage 170. Such data may be retrieved in response to agent 111 interacting with data displayed on spatial computing device 160. In some cases, response data 114 may be configured to be transmitted to caller 109. Additionally, or alternatively, in some cases, response data 114 may be handled by call handler 120 and analyzed by data processing module 130.

It should be noted that while a single caller 109 and a single agent 111 are depicted in FIG. 1, processing system 112 is capable of supporting multiple callers and agents. For instance, during a video conference call, there could be several participants on both ends. In such cases, multiple streams of call data and response data may be present, all of which can be processed by processing system 112. This processing may involve establishing suitable links between various call data and response data, allowing for correspondence between them. Such linking can be based on linguistic analysis of the data, as described further below, as well as considering the timing of the response data in relation to the delivery of the call data.

Caller 109 can be set up to communicate with processing system 112 through designated device 108. Device 108 can be a smartphone, a laptop, a desktop computer, or any other appropriate electronic device (e.g., landline phones, smartwatches, etc.). Device 108 may include components such as a processor, memory, and audio capturing devices such as a microphone and camera, a display and network-related hardware and software components (e.g., Wi-Fi adapters, cellular modem, antennas, network software applications, wireless drivers, and the like) for transmitting call data 110 to processing system 112. All of these components are specifically configured to facilitate the transmission of information from caller 109 to processing system 112.

Similarly, to facilitate communication with caller 109, agent 111 includes spatial computing device 160 configured to optionally receive call data 110 directly via call handler 120 prior to further processing call data 110. In some cases, at least some of processing of call data 110 may be performed prior to agent 111 receiving call data 110. For example, call handler 120 may be configured to remove noise from an audio signal of call data 110, normalize volume of audio signal of call data 110 and the like.

Spatial computing device 160 can include a virtual reality headset, augmented reality glasses, or mixed reality headset to facilitate the display of information to agent 111 during interactions with caller 109. Further, spatial computing device 160 is configured to have a processor, memory, and audio capturing devices such as a microphone and camera, and network-related hardware and software components (e.g., Wi-Fi adapters, Network Interface Controllers, antennas, network software applications, wireless drivers, and the like) for transmitting response data 114 to caller 109.

To ensure the accurate representation of various call data 110 and response data 114, the corresponding devices 108 and 160 associated with caller 109 and agent 111 may be configured to locally record data before transmitting it to the processing system 112. This way, if transmission errors are detected, the data can be retransmitted to ensure clear transmission.

Processing System

In various embodiments, processing system 112 includes any suitable computing system configured to process call data 110 and response data 114 and communicate various data to and from spatial computing device 160. For example, processing system 112 may include servers (e.g., webservers, application servers, file servers, database servers, and the like), databases, cloud computing system, edge computing systems, or any other suitable systems for data processing. In certain instances, system 112 can include workstations, PCs, portable computers, handheld devices, mobile computing devices, one or more virtual computing machines or instances within a data center, and/or network computers.

Processing system 112 includes a processor in signal communication with a memory. It should be noted that while a single processor, and a single memory are described, multiple processors and multiple memory devices can be used by processing system 112. For example, when system 112 includes blade servers, each blade server may have multiple processors, a dedicated memory associated with the blade server, as well as blade server associated interface for communicating data with various other devices.

In various embodiments, a processor of processing system 112 is operably coupled to the memory of system 112. The processor can include any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Further, the processor may include a programmable logic device, a microcontroller, a microprocessor, a graphics processing unit (GPU), a digital signal processor, or an ARM processor.

The memory device of processing system 112, may be any suitable memory for digitally storing data and instructions for execution by the processor of system 112. The memory may include volatile memory, such as various forms of random-access memory (RAM) or other dynamic storage devices, serving to store temporary variables during instruction execution. The stored instructions, accessible to the processor in non-transitory computer-readable storage media, transform processing system 112 into a special-purpose machine tailored for executing the specified operations.

Further, the memory may include non-volatile memory, such as read-only memory (ROM) or other static storage devices linked to the processor via suitable internal I/O system. Further, the memory may include any suitable non-transitory computer-readable medium, such as non-volatile RAM (NVRAM) like FLASH memory, solid-state storage, magnetic disk, or optical disk such as CD-ROM or DVD-ROM, and the like. Non-transitory computer-readable medium may serve to store instructions and data that, when executed by the processor, cause the execution of computer-implemented methods as detailed herein.

The instructions residing in the memory may form one or more sets of organized modules, methods, objects, functions, routines, or calls. These instructions might represent computer programs, operating system services, or application programs, including mobile apps. They may comprise an operating system and/or system software, libraries supporting multimedia or programming functions, data protocol instructions, file format processing instructions, user interface instructions, or application software. The instructions could be used for transmitting data to various other external computing systems such as web servers, databases and the like, as well as receiving information from these external computing systems.

Furthermore, instructions can represent various software applications for data processing. In various embodiments, instructions cause the execution of software applications of call handler 120, data processing module 130, and content generating module 140.

Call Handler

Call data 110 is set up to be managed by a call handler 120. For instance, the call handler 120 might be configured to record call data 110, break it down into segments, and then submit these segments for further processing by data processing module 130. For example, if call data 110 comprises audio data from a call, the audio data can be continuously stored in a file and subsequently divided into meaningful audio segments for processing by data processing module 130. This division can be identified, for instance, by silence regions within the audio data. In some scenarios, call handler 120 might be set up to receive an initial segment of call data 110 from caller 109 and then subsequently receive response data 114. The receipt of the response data can signify the point at which the initial segment of call data 110 is segmented. For example, if call data 110 includes a request such as "Can I book a plane ticket to Los Angeles" and response data 114 contains a question such as "What time would you like to travel," the audio data containing the request can be separated and further analyzed by data processing module 130.

In various scenarios, call handler 120 is configured to manage not only call data 110 but also response data 114. For instance, if response data 114 is in the form of audio data, call handler 120 may be set up to segment that audio data and analyze it using data processing module 130. Specifically, both call data 110 and response data 114 may be simultaneously analyzed as data pertinent to a specific conversation. For example, if response data 114 includes, in response to call data request from caller 109 such as "Can I book a plane ticket to Los Angeles," a segment of response data 114 like "Would you like to travel Monday morning?" followed by an affirmative answer "Yes" from caller 109, response data 114 may be integrated into the analysis. This may be useful, because without the inclusion of response data 114, there may not be sufficient context to determine what the response "Yes" was related to.

In various embodiments, analyzing multiple segments of call data 110 and response data 114 simultaneously allows for a more comprehensive understanding of the context. Alternatively, analyzing large segments of call data 110 and response data 114 ensures that there is sufficient amount of context available for analyzing the conversation.

Data Processing Module

Data processing module 130 is configured to process call data 110 as well as response data 114. Data processing module 130 may be configured to execute at least some of the following: identify a language of a call, transcribe audio data from call data 110 and response data 114 into a communication transcript, identify an intent of a call represented by call data 110, and identify keywords within call data 110 and/or response data 114 related to data records 171 available in data storage 170. Further, data processing module 130 may optionally determine content information available in call data 110 and/or response data 114.

Figure 2:
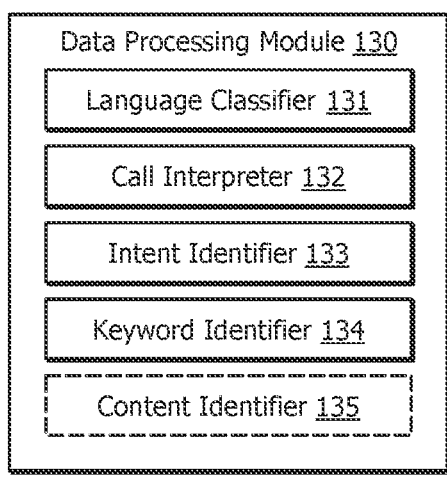
FIG. 2 is a diagram illustrating a data processing module for processing call data, according to an embodiment.

FIG. 2, shows that data processing module 130 may include data processing models 131-135, such as language classifier 131, call interpreter 132, intent identifier 133, keyword identifier 134 and optionally, a content identifier 135. Each of these data processing models is tailored to execute specific functions in processing data, as elaborated further below.

Language Classifier

Language classifier 131 is configured to identify a language in audio data comprising call data 110. For example, language classifier 131 may take an audio segment of a call "Hola, ¿cómo estás? ¿Hablas español?" and determine that the language is Spanish. Language classifier 131 may be include a machine learning model (MLM) trained on a labeled dataset of historical call data in different languages. The labels associated with the labeled dataset represent languages used for the historical call data. Historical call data may represent audio signals associated with various calls in different languages. Language classifier 131 is often trained on large datasets containing audio samples in various languages. During training, language classifier 131 learns to recognize patterns and distinguish between different languages based on their unique acoustic characteristics. It calculates probabilities or scores to determine the likelihood of each language being spoken in the call. Based on the analysis results, the computer classifies the language spoken in the call as the one with the highest probability or score. If necessary, it may also provide confidence scores or probabilities for multiple candidate languages.

In some embodiments, language classifier 131 can additionally perform several steps and techniques. Initially, captured audio data of call data 110 may then undergo preprocessing to enhance its quality and remove noise or distortion, ensuring clearer analysis. Next, language classifier 131 may be configured to extracts relevant features from the audio data. These features may include characteristics such as pitch, intensity, spectral properties, and timing. Subsequently, language classifier 131 utilizes the MLM to analyze the extracted features and determine the language spoken in the call.

In some cases, language classifier 131 may incorporate feedback mechanisms to improve language detection accuracy over time. For example, user feedback or manual verification can be used to correct misclassifications and refine the language classification model.

Different machine learning models can be utilized for language classification. For instance, a language classifier may take the form of a Naive Bayes classifier, support vector machines (SVM), or deep learning models such as Recurrent Neural Networks (RNNs), which can handle sequential data, making them well-suited for text or speech analysis. Additionally, Random Forest classifiers, which combine multiple decision trees, offer robustness and accuracy, especially when confronted with high-dimensional data. Gradient Boosting Machines (GBM) employ a similar strategy, progressively enhancing performance by building upon sequential weak learners. Examples of GBM models commonly used for language identification include XGBoost and LightGBM. Furthermore, K-Nearest Neighbors (KNN) may prove effective in language classification. The selection of the appropriate model may depend on various factors, including the characteristics of the data, dataset size, available computational resources, and desired performance metrics.

Call Interpreter

Call interpreter 132 is configured to convert audio data of call data 110 and response data 114 into a communication transcript comprising a readable text. Converting audio data into the communication transcript may involves a series of steps designed to accurately transcribe spoken content into written text. Initially, call interpreter 132 obtains captured audio data by call handler 120. This captured audio data is then processed using acoustic models to represent the relationship between audio signals and phonemes, the basic units of sound in a language. This enables the system to accurately identify speech sounds, even in the presence of noise or variability. Additionally, language models are employed to predict the likelihood of word sequences in a given language, aiding in the recognition of words and phrases based on context and grammar rules. Once the acoustic and language models have been applied, call interpreter 132 decodes the audio data, generating a sequence of words or tokens that represent the spoken content. This decoding process relies on a combination of acoustic and language modeling techniques to produce the most accurate transcript possible.

Following transcription, the generated transcript may undergo post-processing to correct errors, enhance readability, and format the text according to conventions such as punctuation and capitalization. This ensures that the final transcript is clear, coherent, and accurately represents the original spoken content.

Call interpreter 132 is configured to produce the communication transcript in a readable format, which may include additional features such as timestamps, speaker identification, and other relevant metadata. For example, when the communication transcript is associated with a transcript of a call between caller 109 and agent 111, the communication transcript includes a first labeled text corresponding to inquiries of caller 109 and a second labeled text corresponding to communication of agent 111.

This approach to audio transcription leverages techniques in speech recognition, language processing, and machine learning to facilitate effective communication and information retrieval. In various embodiments, acoustic and language models may be machine-learning models trained to perform text recognition based on audio data on a large collection of historical audio data and corresponding communication transcript data.

It is worth noting that, in some cases, when call data 110 includes text data instead of audio data (e.g., text chat, email, etc.), the text data itself can serve as the communication transcript, eliminating the need to involve call interpreter 132.

Intent Identifier

Intent identifier 133 may be configured to determine the intent of a communication transcript of a call using a natural language processing (NLP) machine learning model (MLM). In some cases, prior to utilizing NLP MLM, communication transcript can undergo preprocessing involving the removal of noise elements like special characters and punctuation, along with tokenization to segment the text into manageable units. Additionally, techniques such as named entity recognition (NER) may be applied to identify and categorize entities within the transcripts. Following preprocessing, features are extracted from the text data using methods such as bag-of-words (BoW), term frequency-inverse document frequency (TF-IDF), or word embeddings, enabling the representation of transcripts in a format suitable for modeling.

In various cases, intent identifier 133 may be trained on a labeled dataset of historical communication transcripts, wherein the labels for the labeled dataset represent intents of the historical communication transcripts.

A suitable machine learning model can be used for intent identifier 133. For example, such machine learning model may be a transformer configured to process natural language. The performance of intent identifier 133 can be assessed through metrics such as accuracy, precision, recall, and F1-score on a distinct test dataset. Upon achieving satisfactory performance, the trained model is deployed for inference, to predict intents for new communication transcripts. Post-processing steps may involve converting numerical labels into human-readable text summarizing the intent.

Keyword Identifier

Keyword identifier 134 is configured to identify keywords within the communication transcript related to information stored in the data records 171 of data storage 170.

Identifying keywords within a communication transcript and associating them with specific fields within data records 171 includes using an NLP MLM. In various cases, data records 171 are organized, ensuring that each data record comprises various fields representing distinct pieces of information. The organization of data records 171 is accomplished by storing a data schema 172, as shown in FIG. 1, associated with data records 171 at data storage 170. Data schema 172 is configured to define the organization, format, and relationships of data within data records 171. It serves as a blueprint or template for how data will be stored, accessed, and manipulated.

In certain implementations, data schema 172 incorporates data record keywords connected to various fields present within data records 171. Data schema 172 is organized to include information detailing the correspondence between specific fields within data records 171 and the associated data record keywords.

For example, a field associated with a product may have a set of data record keywords such as "product name," "device," "product," and the like associated with the product. A description for the product may have associated data record keywords "description," "summary," "product information," "product data," and the like. In various embodiments, various fields within data records 171 are identified by suitable data record keywords. Data record keywords are not limited to single words or a few words but may include more complex structures such as phrases and sentences. In some cases, data record keywords may even include icons, emojis, and the like.

Optionally, data record keywords associated with different fields of data records 171 may be organized hierarchically and stored within data schema 172 to reflect relationships and create a structured taxonomy. Indexing and searching mechanisms may be established, facilitating efficient keyword-based retrieval by creating indexes or data structures for fast lookup. Integration with MLMs may further enhance the process of associating data record keywords with various fields of data records 171. For example, MLMs may be used for automating data record keyword assignment by analyzing textual content and predicting relevant data record keywords based on learned patterns within data records 171.

In various embodiments, when identifying keywords within the communication transcript related to data record keywords, keyword identifier 134 may be configured to perform a semantic comparison. Initially, the communication transcript is preprocessed by tokenizing it into words and performing any necessary cleaning. Word embeddings are then initialized for both the communication transcript and the available data record keywords, representing each word as a dense vector in a high-dimensional space. By calculating the similarity between each word in the communication transcript and each data record keyword using cosine similarity or another metric, semantic relationships between words are quantified. A threshold value is defined to determine if a word in the communication transcript is related to a data record keyword based on the calculated similarity scores. If the similarity score between a word in the communication transcript and a data record keyword exceeds the threshold, that word is considered related to that data record keyword. This process is iterated through each word in the communication transcript, allowing for the identification of various in communication transcript words that are semantically related to the set of available data record keywords. Adjusting the threshold value allows for flexibility in controlling the sensitivity of the association detection. Such adjustment may be accomplished via feedback from agent 111 using response data 114.

Content Identifier

In some cases, besides identifying keywords within the communication transcript, large sections of the communication transcript may be analyzed by content identifier 135 to determine a topic associated with the communication transcript. The identified topic than can be matched with one or more data record keywords for determining fields from data records 171 that need to be accessed. In one implementation, the topic may be a phrase or a sentence, and it can be converted into word embeddings that can, subsequently be compared with embeddings for data record keywords to determine semantic similarity. In some cases, when identifying the topic various methodologies can be employed. One technique may be topic modeling, wherein algorithms like Latent Dirichlet Allocation (LDA) or Non-Negative Matrix Factorization (NMF) discern patterns in word of the communication transcript to group them into a topic.

Alternatively, content identifier 135 could leverage pre-trained Multi-Level Models (MLMs), such as Support Vector Machines (SVM) or neural networks. These models are typically trained on labeled datasets to predict the topic of various communication transcripts. By identifying patterns associated with different topics, these models can effectively categorize text based on its content.

Furthermore, content identifier 135 can use fine-tuned foundational NLP transformer MLMs models specifically trained to determine topics for communication transcripts. These models can be refined by exposing them to examples of labeled communication transcripts. Through this iterative process, the models can learn to correlate language patterns with specific topics, facilitating accurate topic prediction for new text inputs.

Content Generating Module

Returning to FIG. 1, after call data 110 and, in some cases, response data 114 is analyzed by data processing module 130, the language, intent, and keywords associated with call data 110 (response data 114) are identified. Further, topic associated with call data 110 may also be identified. The language, intent, keywords, and, in some cases, topic of call data 110 is then transmitted to content generating module 140 as parameters 139. content generating module 140 is configured to select data from data records 171 for displaying on spatial computing device 160.

Figure 3:
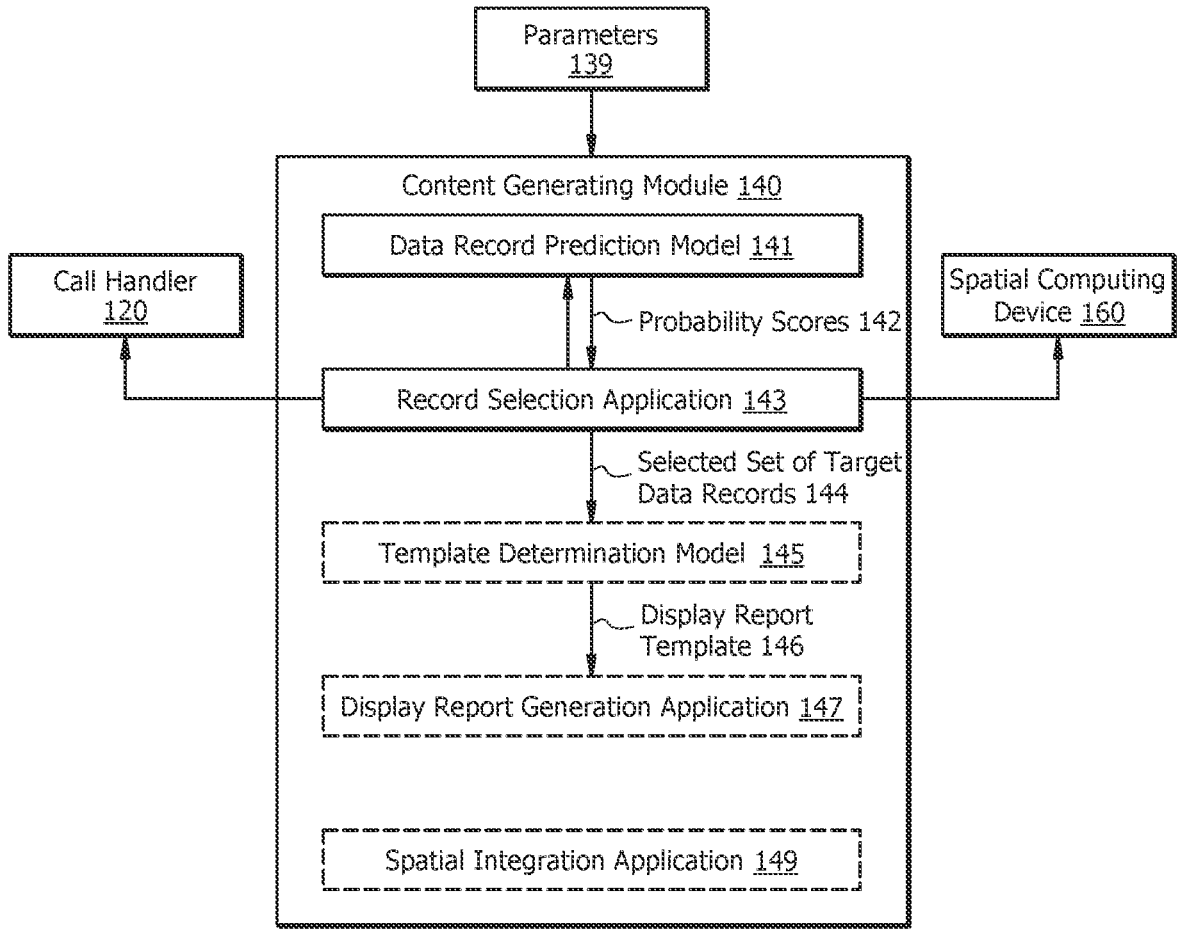
FIG. 3 is a diagram illustrating a content generating model, according to an embodiment.

FIG. 3 shows an example content generating module 140 including a data record prediction model 141, a record selection application 143 and optionally, a template determination model 145 and a display report generation application 147. Furthermore, content generating module 140 optionally include spatial integration application 149, for modifying display report, as further described below. Content generating module 140 is configured to receive parameters 139 that encapsulate the language, intent, keywords, and in some cases, topic of the communication transcript as determined by data processing module 130. Parameters 139 then can be passed to data record prediction model 141 as input data.

Data record prediction model 141 can be used to determine probability scores 142, each probability score indicating a probability that a data record is associated with the communication transcript. Probability scores 142 can be determined using a statistical approach. For instance, intents, keywords, and topics can be represented through suitable word embeddings. These embeddings can then be compared to the word embeddings for data record keywords associated with various fields of data records 171 to determine which one of data records 171 matches the identified intent, keywords, and topic.

Alternatively, data record prediction model 141 may be a trained MLM configured to take input data comprising data records 171 and a text-string identifying a language, an intent, and keywords, and output the probability scores 142 corresponding to data records 171 that these date records are associated with the language, intent and keywords provided in the input data.

In one implementation, the data record prediction model 141 includes a parsing application designed to scan data records for various text data. Alternatively, data record keywords linked to various fields of data records can serve as information about the data records, aiding in determining if data records match the language, intent, and keywords of the communication transcript, as determined by data processing module 130.

In certain scenarios, all the necessary information for selecting the appropriate data record based on language, intent, keywords, and topic associated with call data 110 might be encapsulated within data schema 172. For instance, data schema 172 could include data record keywords linked to diverse fields of data records 171, structured in a manner facilitating easy identification of fields and data records associated with various data record keywords. In various embodiments, as data records 171 are updated, data schema 172 may be modified.

In certain cases, a crawler application may be associated with data storage 170 and can be used to reconstruct data schema 172 based on changes in data records 171. For example, the crawler application can parse each data record to extract relevant information, including text from different fields of data records and metadata such as timestamps associated with the time the data records were modified.

After extracting the data, the crawler application can analyze the patterns and structures present in the data records 171. It may identify common attributes, keywords, or themes that recur across different records. Based on this analysis, the crawler can assist in rebuilding data schema 172 by identifying relevant attributes and their relationships, which can then be organized into a structured schema format. This process ensures that the schema accurately reflects the data records' contents and changes over time.

In various embodiments, data record prediction model 141 is trained using a labeled dataset that consists of a set of historical data records. This dataset includes not only the historical data records themselves but also contextual information about the language, intent, and keywords associated with past communication transcripts. The labels assigned to this dataset correspond to a historical array of probability scores linked to the set of historical data records.

This training process enables data record prediction model 141 to learn from past instances, leveraging the wealth of historical data and associated contextual information to enhance its predictive capabilities. By incorporating patterns and relationships between language, intent, keywords, and data records from previous communication transcripts, the model can effectively predict the likelihood of relevance for new data records.

In various embodiments, content generating module 140 may select a set of target data records from data records 171 to be presented on the display of spatial computing device 160 for the agent 111 to view using a record selection application 143. The record selection application 143 may receive probability scores 142 and use that information for selecting the set of target data records. For instance, once a probability score is determined for each data record from data records 171, record selection application 143 may choose data records with the highest ranked probability scores for display on the spatial computing device 160's screen. For example, record selection application 143 may be configured to select the top 10 ranked data records, including the top 1, top 2, top 3, and so forth, based on their probability scores. In some cases, data records with probability scores above a certain predetermined threshold may be selected. For example, data records with probability scores above 0.5, 0.6, 0.7, 0.8, 0.9, 0.95, 0.99, and the like may be selected.

In various embodiments, the content generating module 140 not only selects target data records to be presented on the display of spatial computing device 160 but also generates a suitable display report based on the selected set of target data records and transmits it to the spatial computing device 160 for rendering on its display.

In one example embodiment, the display report is generated by presenting the selected set of target data records in the default format available for displaying such records on spatial computing device 160. For instance, in certain cases, the selected set of target data records consists of tabulated data. Therefore, the generation of the display report involves displaying this tabulated data.

Alternatively, in another example embodiment, the display report is generated using a template determination model 145, which may receive selected set of target data records 144. Template determination model 145 may generate a display report based on display report templates stored in a memory associated with processing system 112. These display report templates may have associated template-related keywords. Furthermore, display report templates are configured to include report fields having associated template field-related keywords.

Template determination model 145 is configured to identify display report templates based on the language, intent, keywords, and, in some cases, the topic of the communication transcript.

Template determination model 145 functions similarly to the data record prediction MLM, being trained to output a probability score for selecting a suitable display report template for presenting information associated with the selected set of target data records. However, unlike the data record prediction model, template determination model 145 returns a single template, while the data record prediction model may select multiple data records forming the selected set of target data records.

Similar to some implementations of the data record prediction model, the template determination model may be an MLM trained to select a display report template based on parameters 139, which include the language, intent, keywords, and, in some cases, the topic of the communication transcript.

In some cases, when display report templates have associated template-related keywords, such keywords may be mapped to the identified intent (e.g., using semantic similarity comprising comparing embeddings for template-related keywords and intent). Subsequently, template determination model 145 is configured to select from a plurality of display report templates corresponding to the plurality of intents a target display report template corresponding to the identified intent. It should be noted, that while intent can be used for selecting display report template, in other embodiments, the intent and keywords, and/or the intent, keywords and the topic of communication transcript can be mapped to template-related keywords via semantic similarity. As shown in FIG. 3, display report template 146 is selected by template determination model 145 and transmitted to a display report generation application 147 for generating a display. In various cases, display report template 146 include report fields corresponding to at least some data fields of selected set of target data records 144. The correspondence can be established by comparing (e.g., using semantic similarity) template filed-related keywords with data record keywords associated with selected set of target data records 144. Consequently, display report generation application 147 is configured to populate the report fields of display report template 146 with at least some data fields of selected set of target data records 144.

In a scenario where a field within the display report template can draw data from multiple target data records, it can be set up to gather information from the corresponding field within the target data record with the highest probability score, as determined by the data record prediction model 141. Additionally, if a first field in the display report template is linked to a second field in such a way that both fields should be populated using data from the same data record, they are configured to draw data from the same data record. If such data record contains data solely for populating the first field in the display report template but lacks information for populating the second field, the second field is configured to remain blank. For instance, if the display report template comprises a first field for a person's name and the name is available in the identified target data record, it can be populated accordingly. However, if the template includes a second field corresponding to the person's level of education, this field may remain empty if such information is not available in the identified target data record.

In some cases, besides populating the display report template 146 with information from the selected set of target data records 144 to generate a display report, an alternative approach involves populating a suitable form. For instance, the template determination model 145 might, in addition to or instead of selecting the display report template (such as display report template 146), opt for selecting a template form for populating with at least some fields of the selected set of target data records 144. The process of populating the template form with data may resemble the process of populating the display report template 146. For example, the template form may consist of associated fields and field-related keywords that can be compared (e.g., via semantic similarity) to data record keywords to determine the correspondence of fields within the template form with fields of the selected set of target data records 144. In various embodiments, the template form may be automatically populated with information obtained from the selected set of target data records 144. Subsequently, the template form can be transmitted to the caller 109 via any suitable means (e.g., via text message, email, file upload, etc.). In some cases, besides (or instead of) being transmitted to caller 109, the template form may be displayed on a display of spatial computing device 160 to be reviewed by agent 111.

Content generating module 140 is configured to transmit generated display report to spatial computing device 160, as shown in FIG. 1. In various embodiments, before transmitting the display report, content generating module 140 may interact with spatial computing device 160 via spatial integration application 149 to determine characteristics of spatial computing device 160. These characteristics include aspects such as the resolution of the display, refresh rate, field of view (FoV), color accuracy and contrast, display latency, lens distortion, or any other relevant features.

In some instances, the characteristics of spatial computing device 160 can be obtained based on its make and/or model. These device-specific traits may play a role in determining how the display report is presented to the user (e.g., agent 111) of spatial computing device 160.

In some embodiments spatial integration application 149 may be configured to adapt the display report before transmitting it to the spatial computing device 160. For instance, considering the field of view of spatial computing device 160, a specific spatial arrangement of information may be selected to ensure optimal visibility within the agent's field of view when viewing data using spatial computing device 160. Furthermore, in addressing lens distortion, positional adjustments may be made to ensure that information is positioned closer to the center of the display of spatial computing device 160 to mitigate distortion at the edges caused by lens aberrations.

By incorporating these considerations into the display report generation process, spatial integration application 149 enhances the user experience by optimizing the presentation of information on spatial computing device 160.

In one example embodiment, spatial integration application 149 is configured to receive information about a type of the spatial computing device, determine spatial integration instructions for rendering the display report based on the type, and render the display report on the display consistent with the spatial integration instructions. The spatial integration instructions may involve determining how information is distributed within the field of view of agent 111 when agent 111 is using spatial computing device 160.

In some cases, based at least in part on the identified intent, record selection application 143 may be configured to request additional communication transcript data from call handler 120. This additional data may be available within received call data 110. However, if such supplementary communication transcript data is unavailable, record selection application 143 can communicate with spatial computing device 160 via the communication interface 161 to prompt a message to agent 111, indicating the need for further call data collection before determining the target data records to be displayed.

Upon receiving this message, agent 111 may initiate communication with caller 109 via response data 114 to gather the required additional information. Once the additional communication transcript data is obtained, for example, by processing additional audio data from call data 110 using call interpreter 132, it can be utilized to determine which data records should be presented to agent 111 via spatial computing device 160.

It's important to note that apart from the identified intent, other discernible parameters such as language, keywords, the topic of the call as identified in the communication transcript, and similar factors, as well as low probability scores (e.g., scores below a predetermined minimal threshold) for predicted target data records, may suggest that acquiring additional communication transcript data could enhance the determination of which data records are suited to be presented to agent 111. The predetermined minimal threshold can take various suitable values, such as 0.3, 0.4, 0.5, 0.6, 0.7, and so forth.

Figure 4:
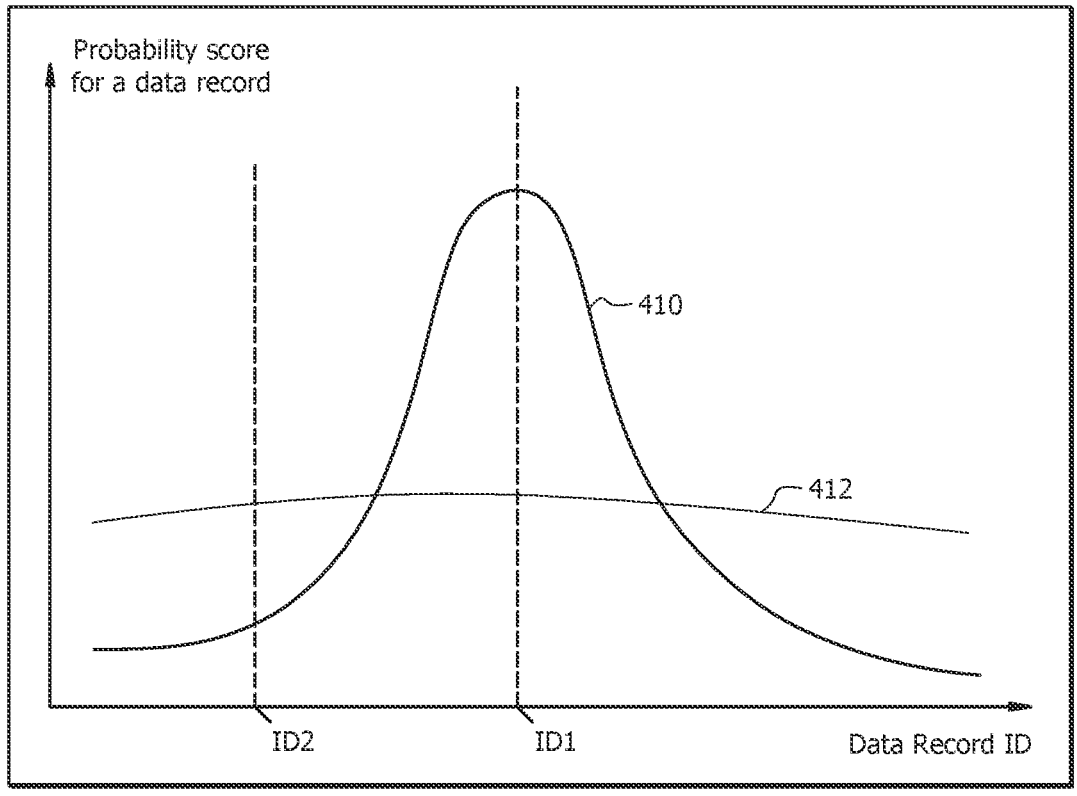
FIG. 4 is an example graph illustrating various probability score distributions, according to an embodiment.

Additionally, in cases where the probability scores for various data records are approximately equal, making it challenging to select standout data records, acquiring additional communication transcript data may be preferable. For instance, in FIG. 4, illustrative curves 410 and 412 display probability scores for different data records. If, for instance, curve 412 exhibits approximately constant probability scores, it might suggest that collected communication transcript data may not be sufficient to accurately determine which data records need to be selected for displaying on a display of spatial computing device 160, and that more communication transcript data may be collected. Conversely, curve 410 showcases a distinct peak probability value for a data record with identification ID1 compared to another data record with identification ID2, indicating that additional communication transcript data may not be necessary.

To quantify whether a probability score curve is relatively flat or possesses a pronounced peak, one can use the ratio of the highest to lowest probability value. For example, if this ratio exceeds a predetermined threshold, the curve may be deemed to have a sufficiently pronounced peak, and additional communication transcript data may not be needed. This predetermined threshold ratio can range, for example, from 1.1 to 2, encompassing all values in between. Alternatively, the threshold ratio may range from 1.5 to 3, with all intermediary values allowed.

Furthermore, to assess if the probability score distribution exhibits a pronounced peak, in addition to the ratio between the highest and lowest probability values, the spread of probability values around a peak value may provide insights into the shape of the peak. This spread can be quantified by the Full Width at Half Maximum (FWHM). For instance, if the data records within the FWHM constitute less than 90% of all data records, the curve may possess a sufficiently pronounced peak. The percentage of data records within FWHM may vary, such as being less than 80%, 70%, 60%, 50%, 40%, and so forth.

In various embodiments, such analysis of probability scores for different data records may be performed by record selection application 143. For example, when it is determined that probability scores are relatively constant (as shown for example by curve 412 in FIG. 4), record selection application 143 may communicate to agent 111 via spatial computing device 160 that additional communication transcript data needs to be collected.

The parameters, such as the predetermined threshold ratio and/or the percentage of data records within the FWHM, used to determine the desired shape of a probability score distribution, which can indicate the need for acquiring additional communication transcript data, can be controlled. This control can be facilitated through inputs from agent 111 or via any other suitable means (e.g., by tuning parameters for data record prediction model 141). As shown in FIG. 1, agent 111 may be configured to communicate with content generating module 140, and such communication can be used to adjust parameters of data record prediction model 141.

In various cases, when additional communication transcript data is acquired, the process of selecting a set of target data records may be repeated. Such process, as previously discussed, involves utilizing data processing module 130 to determine new intent, keywords, and, in some cases, topics based on the additional communication transcript data. These newly derived parameters, encapsulated as parameters 139, serve as inputs to data record prediction model 141 of the content generating module 140, resulting in the generation of new probability scores for various data records 171. Subsequently, after obtaining the new probability scores, a new set of target data records may be chosen, comprising those with the highest ranking probability scores. For instance, this new set of target data records may include the top 10 data records with the highest probability scores. Alternatively, it could consist of the top 1 to 9 highest ranked data records, and so forth.

Once the new set of target data records is selected, another display report based on these chosen records is generated. This report is then rendered on the display of spatial computing device 160, ensuring that the most relevant and up-to-date information is available to the user.

Spatial Computing Device

Returning to FIG. 1, content generating module 140 is configured to transmit generated display report to spatial computing device 160. Spatial computing device 160 includes a communication interface 161 configured to receive display report generated by content generating module 140, a spatial integration application 163, and a content interface 165.

In various embodiments, communication interface 161 is configured to receive data from content generating module 140 and provide it to spatial integration application 163 for displaying the display report on a display of spatial computing device 160. Furthermore, in some cases, communication interface 161 is configured transmit to spatial integration application 149 of content generating module 140 information about characteristics of spatial computing device 160. In some cases, as discussed before, agent 111 may communicate data with various models of content generating module 140 via communication interface 161. For example, agent 111 may have an ability to tune parameters of data record prediction model 141 or receive a message from record selection application 143 that additional communication transcript data may need to be collected. In response, agent 111 may either confirm collection of the additional communication transcript data or provide instructions to proceed further without the additional communication transcript.

Spatial integration application 163 can be configured to render the display report on the display of spatial computing device 160. As agent 111 reviews the display report, agent 111 may interact with the displayed data through content interface 165. Content interface 165 includes various peripheral devices such as a mouse, keyboard, mouse pad, and associated software applications, enabling agent 111 to engage with the displayed information in the display report.

For instance, agent 111 may open folders, input text into forms or applications, and request data from data storage 170. Such requests are communicated to data storage 170 via communication interface 161, and data storage 170 in turn provides the requested data to spatial computing device 160 via communication interface 161.

In certain cases, content interface 165 enables the receipt of feedback from agent 111 to assess the accuracy of the display report. Based on this feedback, such as instances where agent 111 identifies discrepancies where the presented information does not align with the language, intent, keywords, and, occasionally, the topic identified within the communication transcript, the content generating module 140 may be configured to choose another (second) set of target data records, from which information will be displayed to agent 111. In an example embodiment, the feedback may be communicated to record selection application 143, and record selection application 143 may select the second set of target data records.

In some scenarios, the second set of target data records may have corresponding probability scores, as determined by the data record prediction model 141, ranking below the probability scores of the initial set of target data records. Additionally, the record selection application 143 may select data records with the highest ranked probability scores below those of the initial set of target data records for display on the spatial computing device 160's display. For instance, the record selection application 143 may choose data records that follow after the top 10 ranked data records. These data records could follow after top 1, top 2, top 3, and so forth ranked data records.

Moreover, in some cases, data records with probability scores below a certain first predetermined threshold and above a certain second predetermined threshold may be selected. For example, data records with probability scores between 0.8 and 0.99, between 0.7 and 0.9, or between any other two suitable thresholds may be chosen. It should be noted that in various embodiments, the second set of selected target data records is configured not to overlap with the initial set of target data records.

Subsequently, after selecting the second set of target data records, the content generating module 140 is configured to generate a new display report based on the second set of target data records and render it on the display of spatial computing device 160. In an example embodiment, this new display report is generated by applying the template determination model 145, and utilizing the display report generation application 147, along with optionally, the spatial integration application 149.

Data Storage

Referring back to FIG. 1, both processing system 112 and spatial computing device 160 are designed to establish communication with data storage 170. Data storage 170 is configured to store data records 171 alongside data schema 172. It should be noted that data schema 172 is subject to updates, particularly when modifications occur within the data records 171.

Data storage 170 may include a range of storage solutions, including databases, storage area networks (SANs), distributed file systems, among others, ensuring the secure storage of data records 171. Data storage 170 is equipped with various memory devices and processors responsible for managing data storage operations, including updating data schema 172 and facilitating data communication between processing system 112, spatial computing device 160, and data storage 170. In various embodiments, the memory devices and processors integrated within data storage 170 function similarly to those found in processing system 112. It should be noted that data storage 170 may include data records which are stored locally (e.g., on a local storage system associated with processing system 112) as well as data records which may be stored externally (e.g., on a cloud storage system, or any other system connected to processing system 112 via a suitable network).

Methods for Rendering a Display Record

Figure 5A:
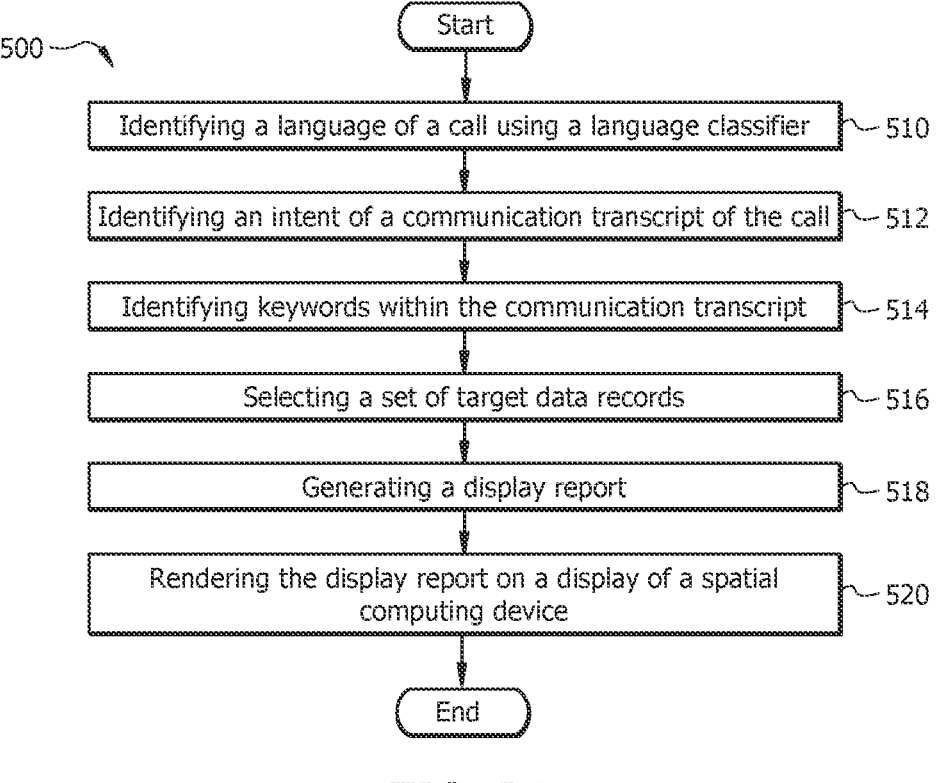
FIG. 5A is a flowchart of an illustrative method for rendering a display report, according to an embodiment.

FIG. 5A illustrate an example method 500 for rendering display record on a display of spatial computing device 160. Method 500 may be performed by various models and applications of processing system 112. Method 500 includes at step 510 identifying a language of a call using a language classifier. The language classifier can be, for example, language classifier 131, as shown in FIG. 3. Further, at step 512, method 500 includes identifying an intent of a communication transcript of the call. The intent may be identified by processing the communication transcript using an intent identifier that can be an NLP MLM. For example, the intent identifier may be intent identifier 133, as shown in FIG. 3. Method 500 proceeds to step 514, at which keywords in the communication transcript are identified. The keywords may be related to information stored in data records, such as data records 171, as shown in FIG. 1. The keywords may be identified using a suitable model such as keyword identifier 134, which may be an NLP MLM. At step 516, method 500 includes selecting a set of target data records to be associated with the communication transcript. The set of target data records can be selected from data records such as data records 171. Further, after completion of step 516, at step 518 method 500 includes generating a display report based on the selected set of target data record, and at step 520, rendering the display report on the display of the spatial computing device, such as spatial computing device 160.

Figure 5B:
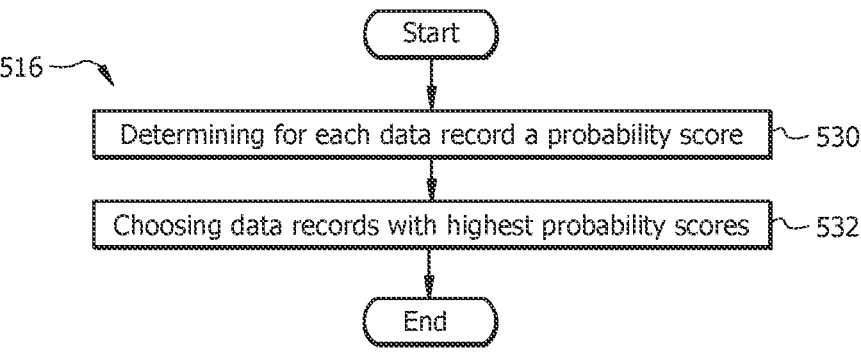
FIG. 5B is a flowchart of sub-steps of one of the steps of the flowchart shown in FIG. 5A, according to an embodiment.

FIG. 5B shows further sub-steps 530 and 532 of step 516 of method 500. At sub-step 530, the selecting the set of target data records includes determining for each data record from the set of data records, a probability score that each data record is associated with the communication transcript. The probability score is determined by a data record prediction model, such as data record prediction model 141. After completion of sub-step 530, at sub-step 532, the selecting the set of target data records includes choosing the set of target data records being data records with corresponding probability scores having highest ranking. Such selectin of target data records may be performed by record selection application 143. In various cases, the number of target data records within the set of target data records is a selected number which may be, for example 1-10 target data records, or any other suitable number (e.g., a few tens of target data records).

Figure 6:
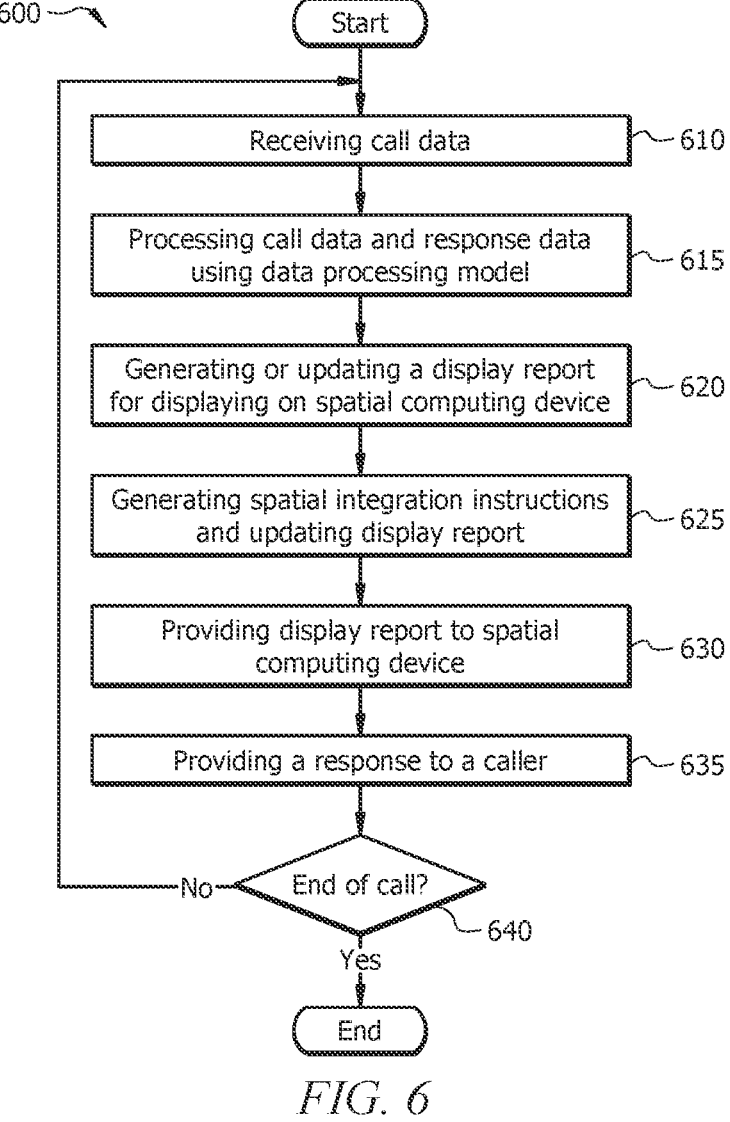
FIG. 6 is a flowchart of an illustrative method for providing a response to a caller, according to an embodiment.

FIG. 6 illustrates an example method 600 for providing display report to spatial computing device such as spatial computing device 160. Method 600 may be performed by various models and applications of processing system 112. At step 610, method 600 includes receiving call data from a caller and a response data from a call recipient. The call data can be, for example, call data 110 from caller 109, and response data can be, for example, response data 114, from agent 111, as shown in FIG. 1. At step 615, the call data and response data are configured to be processed by data processing model, which can be, for example, data processing module 130, as shown in FIG. 1. Following step 615, at step 620, method 600 includes generating or updating a display report for displaying on the spatial computing device. The display report may be generated if it was not previously generated. Alternatively, if the display report was previously generated, the display report may be updated. Further, method 600 includes an optional step of generating spatial integration instructions at step 625. Such instructions may be generated based on characteristics of the spatial computing device, as previously discussed. Subsequently, the display report may be updated based on the spatial integration instructions. For example, display report may be updated to better fit on a display of the spatial computing device. After completion of step 625, at step 630, method 600 includes providing the display report to the spatial computing device for displaying the display report to a user of the spatial computing device (e.g., an agent 111, as shown in FIG. 1). After providing the display report to the user, method 600 includes providing a response to the caller at step 635. The response to the caller may be communicated via the response data, such as response data 114, as shown in FIG. 1. If after providing the response to the caller the call can be ended (step 640, Yes), method 600 may be completed. Alternatively, if it is determined (e.g., by agent 111) that the call should not end (step 640, No), method 600 is configured to proceed to perform step 610 of method 600.

Figure 7:
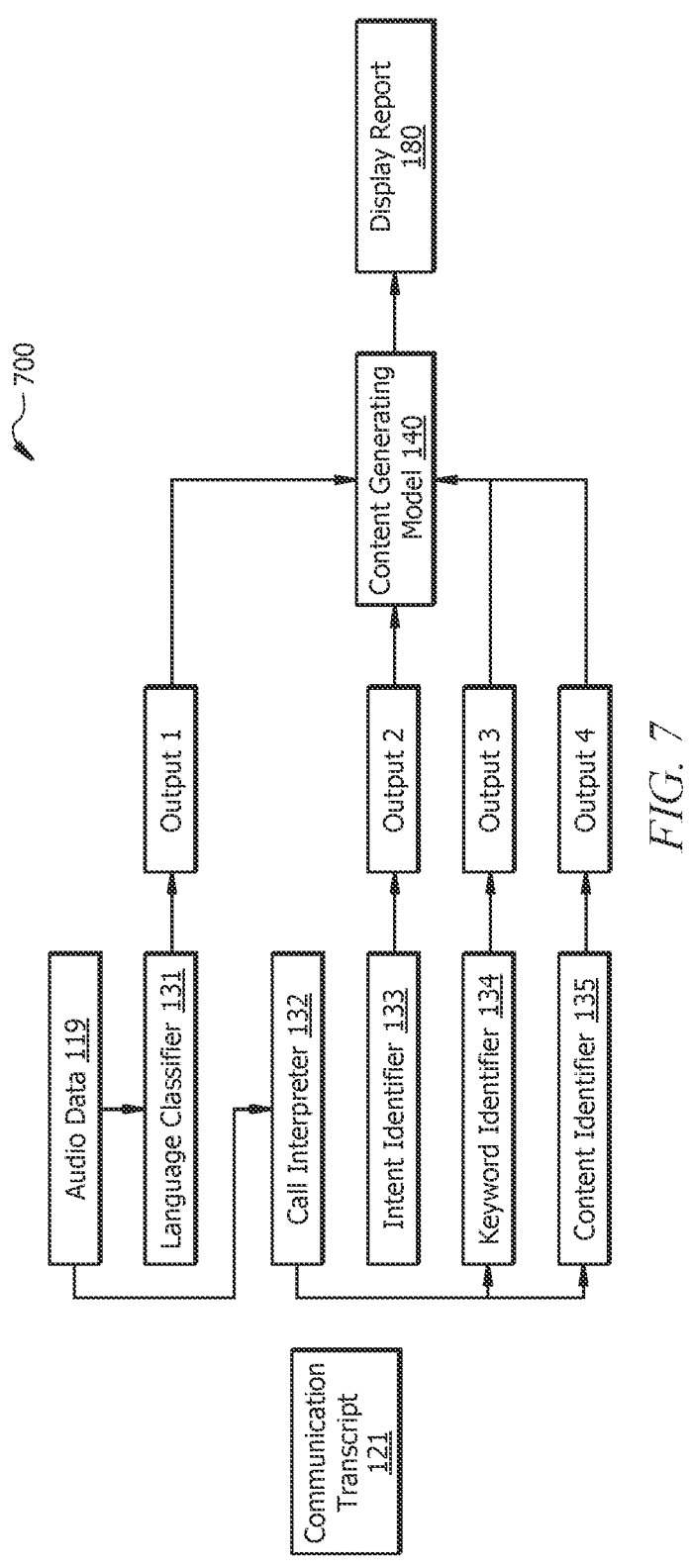
FIG. 7 is a diagram illustrating a process of using multiple models for obtaining a data report, according to an embodiment.

FIG. 7 shows a diagram 700, which illustrates the application of various models 131-136 for obtaining a display report 180. Diagram 700 shows the sequential application of models 131-136, depicting their cascading nature in generating display report 180.

In diagram 700, audio data 119, representing call data 110 (and/or response data 114) from a call (as depicted in FIG. 1), serves as the primary input. Audio data 119 is first used as an input for language classifier 131, which then produces Output 1 directed to the content generating module 140. Concurrently, the same audio data 119 is utilized as input for call interpreter 132, which in turn generates a communication transcript 121 of the call. communication transcript 121 is subsequently forwarded to intent identifier 133, keyword identifier 134, and content identifier 135. Each of these identifiers processes the communication transcript and produces corresponding outputs, labeled as Output 2-4, which are transmitted to content generating module 140.

As previously described, content generating module 140 is configured to synthesize Output 1-4 and generate display report 180. This comprehensive approach ensures that the information obtained from the call data and/or response data 114, is analyzed through multiple models and presented in display report 180.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, for displaying content on a display of a spatial computing device, the system comprising:

a memory configured to store a set of data records, each one of the set of data records including one or more data fields; and a processor operably coupled to the memory, the processor configured to:

receive an audio signal associated with a call;

preprocess the audio signal to remove noise from the audio signal;

in response to removing the noise from the audio signal, extract one or more characteristics associated with the audio signal, wherein the one or more characteristics comprises spectral properties associated with the audio signal;

in response to extracting the one or more characteristics, identify a language of the call based on the spectral properties associated with the audio signal;

convert the audio signal into a communication transcript, wherein the communication transcript comprises one or more keywords and one or more character elements;

preprocess the communication transcript to remove the one or more character elements;

identify an intent of the communication transcript of the call based on the preprocessed communication transcript using a first natural language processing (NLP) machine learning model (MLM), wherein the first NLP MLM is trained on a first labeled dataset of historical communication transcripts, wherein first labels for the first labeled dataset represent intents of the historical communication transcripts;

identify the one or more keywords within the communication transcript using a second NLP MLM, the one or more keywords related to information stored in the set of data records;

select a set of target data records from the set of data records to associate with the communication transcript by:

determining for each data record from the set of data records, a probability score that each data record is associated with the communication transcript, wherein the probability score being determined by a data record prediction model; and choosing the set of target data records being data records with corresponding probability scores having highest ranking, wherein a number of target data records within the set of target data records is a selected number;

generate a display report based on the selected set of target data records; and render the display report on the display of the spatial computing device.

2. The system of claim 1, wherein identifying the language of the call is performed by using a language classifier, wherein the language classified is an MLM trained on a second labeled dataset of historical call data in different languages.

3. The system of claim 2, wherein second labels associated with the second labeled dataset represent languages used for the historical call data.

4. The system of claim 3, wherein the data record prediction model is configured to take input data comprising a data record and a text-string identifying a language and an intent, and output the probability score.

5. The system of claim 4, wherein the data record prediction model is trained using a third labeled dataset including:

the set of data records;

associated training input data, each one of the training input data containing information about a language and an intent; and wherein third labels associated with the third labeled dataset represent a set of probability scores associated with the set of data records.

6. The system of claim 1, wherein the processor is further configured to:

receive the audio signal representing the call via a microphone associated with the spatial computing device.

7. The system of claim 1, wherein the generation of the display report comprises:

selecting from a plurality of display report templates corresponding to plurality of intents a target display report template corresponding to the identified intent, wherein each one of the plurality of display report templates includes report fields corresponding to at least some data fields of the set of target data records; and populate the report fields of the target display report template with the at least some data fields of the set of target data records.

8. The system of claim 1, wherein the processor is further configured to:

select a template form, the template form including report fields; and populate the report fields by automatically filling the template form with information obtained from the set of target data records.

9. The system of claim 1, wherein the set of target data records comprises tabulated data, and wherein the rendering of the display report comprises displaying the tabulated data.

10. The system of claim 1, wherein the call is between a caller and an agent, and wherein the communication transcript comprises a first labeled text corresponding to inquiries of the caller and a second labeled text corresponding to the communication of the agent.

11. The system of claim 1, wherein the processor is further configured to:

receive information about a type of the spatial computing device;

determine spatial integration instructions for rendering the display report based on the type; and render the display report on the display consistent with the spatial integration instructions.

12. The system of claim 1, wherein the set of target data records is a first set of target data records, the selected number is the first selected number, and the display report is a first display report, the processor is further configured to:

receive feedback determining an accuracy of the first display report;

based on the feedback, when the first display report is determined to be inaccurate:

select a second set of target data records having corresponding probability scores ranking below the probability scores of the first set of target data records, wherein a number of target data records within the set of second target data records is a second selected number;

generate a second display report based on the second set target data records; and render the second display report on the display of the spatial computing device.

13. The system of claim 1, wherein the processor is further configured to, based at least in part upon the identified intent:

request additional communication transcript data;

receive the additional communication transcript data; and update the intent, based on the received additional communication transcript data.

14. The system of claim 13, wherein the processor is further configured to:

select another set of target data records from the set of data records to associate with the additional communication transcript data by:

determining for each data record from the set of data records, a probability score that each data record is associated with the additional communication transcript data; and selecting the another set of target data records being data records with corresponding probability scores having highest ranking;

generate another display report based on the another set of target data records; and render the another display report on the display of the spatial computing device.

15. A method for displaying content on a display of a spatial computing device, the method comprising:

receiving an audio signal associated with a call;

preprocessing the audio signal to remove noise from the audio signal;

in response to removing the noise from the audio signal, extracting one or more characteristics associated with the audio signal, wherein the one or more characteristics comprises spectral properties associated with the audio signal;

in response to extracting the one or more characteristics, identifying a language of the call based on the spectral properties associated with the audio signal;

converting the audio signal into a communication transcript, wherein the communication transcript comprises one or more keywords and one or more character elements;

preprocessing the communication transcript to remove the one or more character elements;

identifying an intent of the communication transcript of the call based on the preprocessed communication transcript using a first natural language processing (NLP) machine learning model (MLM), wherein the first NLP MLM is trained on a first labeled dataset of historical communication transcripts, wherein first labels for the first labeled dataset represent intents of the historical communication transcripts;

identifying the one or more keywords within the communication transcript using a second NLP MLM, the one or more keywords related to information stored in a set of data records;

selecting a set of target data records from the set of data records to associate with the communication transcript by:

determining for each data record from the set of data records, a probability score that each data record is associated with the communication transcript, wherein the probability score being determined by a data record prediction model; and choosing the set of target data records being data records with corresponding probability scores having highest ranking, wherein a number of target data records within the set of target data records is a selected number;

generating a display report based on the selected set of target data records; and rendering the display report on the display of the spatial computing device.

16. The method of claim 15, further comprising:

receiving the audio signal representing the call via a microphone associated with the spatial computing device.

17. The method of claim 15, wherein the generation of the display report comprises:

selecting from a plurality of display report templates corresponding to plurality of intents a target display report template corresponding to the identified intent, wherein each one of the plurality of display report templates includes report fields corresponding to at least some data fields of the set of target data records; and populating the report fields of the target display report template with the at least some data fields of the set of target data records.

18. A non-transitory computer-readable medium storing instructions that, when executed by one or more processors, cause the one or more processors to:

receive an audio signal associated with a call;

preprocess the audio signal to remove noise from the audio signal;

in response to removing the noise from the audio signal, extract one or more characteristics associated with the audio signal, wherein the one or more characteristics comprises spectral properties associated with the audio signal;

in response to extracting the one or more characteristics, identify a language of the call based on the spectral properties associated with the audio signal;

convert the audio signal into a communication transcript, wherein the communication transcript comprises one or more keywords and one or more character elements;

preprocess the communication transcript to remove the one or more character elements;

identify an intent of the communication transcript of the call based on the preprocessed communication transcript using a first natural language processing (NLP) machine learning model (MLM), wherein the first NLP MLM is trained on a first labeled dataset of historical communication transcripts, wherein first labels for the first labeled dataset represent intents of the historical communication transcripts;

identify the one or more keywords within the communication transcript using a second NLP MLM, the one or more keywords related to information stored in a set of data records;

select a set of target data records from the set of data records to associate with the communication transcript by:

determining for each data record from the set of data records, a probability score that each data record is associated with the communication transcript, wherein the probability score being determined by a data record prediction model; and choosing the set of target data records being data records with corresponding probability scores having highest ranking, wherein a number of target data records within the set of target data records is a selected number;

generate a display report based on the selected set of target data records; and render the display report on the display of a spatial computing device.

19. The non-transitory computer-readable medium of claim 18, wherein the instructions, when executed by the one or more processors, further cause the one or more processors to:

receive the audio signal representing the call via a microphone associated with the spatial computing device.

20. The non-transitory computer-readable medium of claim 18, wherein the generation of the display report comprises:

selecting from a plurality of display report templates corresponding to plurality of intents a target display report template corresponding to the identified intent, wherein each one of the plurality of display report templates includes report fields corresponding to at least some data fields of the set of target data records; and populating the report fields of the target display report template with the at least some data fields of the set of target data records.

\* \* \* \* \*